US007711208B2

(12) United States Patent (10) Patent No.: US 7,711,208 B2
Grunder (45) Date of Patent: May 4, 2010

(54) METHOD FOR CHANGING THE DIMENSIONS OF AN ELECTRONICALLY STORED IMAGE

(75) Inventor: Bernhard Grunder, Lieser (DE)

(73) Assignee: Socoto GmbH & Co. KG, Trier (DE)

( * ) Notice: Subject to any disclaimer, the term of this patent is extended or adjusted under 35 U.S.C. 154(b) by 1272 days.

(21) Appl. No.: 10/979,984

(22) Filed: Nov. 3, 2004

(65) Prior Publication Data

US 2005/0116965 A1 Jun. 2, 2005

(30) Foreign Application Priority Data

Nov. 6, 2003 (DE) ................................ 103 52 341

(51) Int. Cl.
*G06K 9/32* (2006.01)
(52) U.S. Cl. .................. 382/298; 345/660; 345/666; 715/243; 715/244; 715/252
(58) Field of Classification Search .............. 345/619, 345/620, 660–671; 715/234–253, 788, 800; 382/298
See application file for complete search history.

(56) References Cited

U.S. PATENT DOCUMENTS

| 5,577,189 | A |   | 11/1996 | Gay et al. |
| 5,592,574 | A | * | 1/1997  | Chilton et al. ............... 382/295 |
| 5,649,186 | A | * | 7/1997  | Ferguson ...................... 707/10 |
| 5,751,283 | A | * | 5/1998  | Smith ........................... 715/798 |

(Continued)

FOREIGN PATENT DOCUMENTS

DE 19653435 6/1998

(Continued)

OTHER PUBLICATIONS

English language translation of German Office action for German application No. 10352341.3 filed Nov. 6, 2003.*

(Continued)

*Primary Examiner*—Bhavesh M Mehta
*Assistant Examiner*—Sean Motsinger
(74) *Attorney, Agent, or Firm*—Stetina Brunda Garred & Brucker

(57) ABSTRACT

The invention relates to a method for changing the dimensions of an electronically stored image which is composed of individual objects that are arranged below or next to one another or that fully or partially overlap one another, in which the image is changed in at least one horizontal or vertical image dimension and at least some of the individual objects are changed in at least one horizontal or vertical object dimension and the change in the object dimension is sometimes not necessarily proportional to the change in the image dimension. This method is currently carried out manually.

Figure 1:
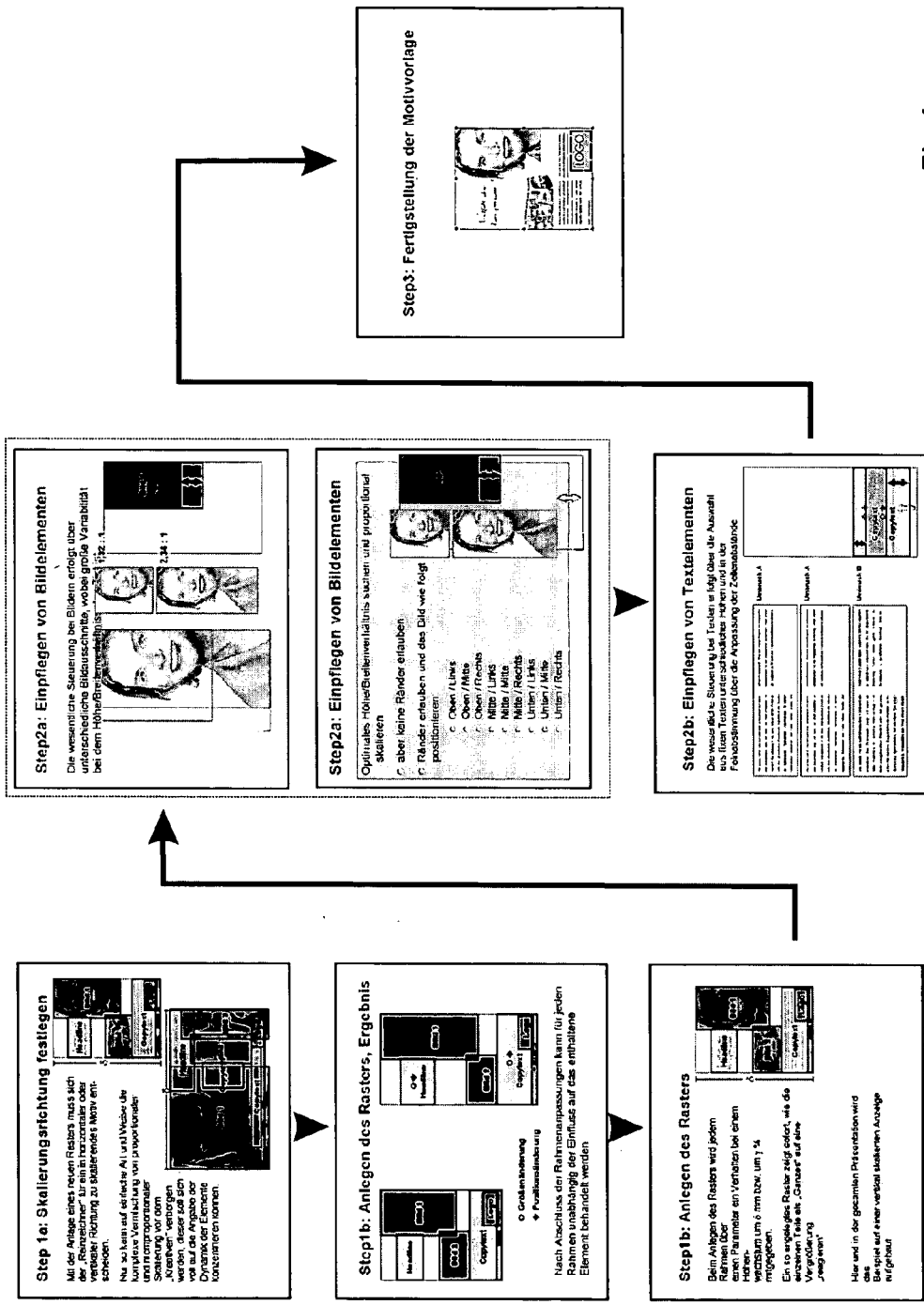
Figure 1A:
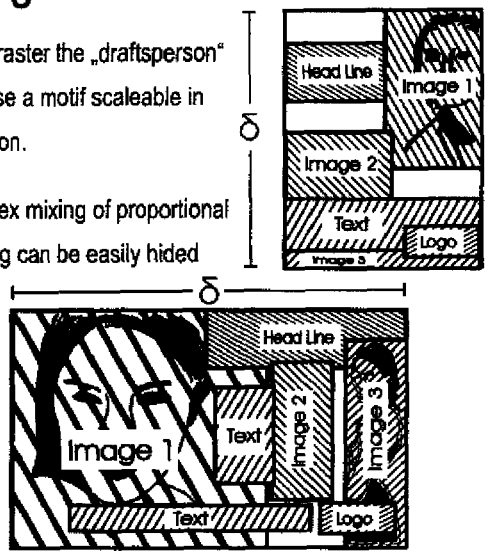
Figure 1C:
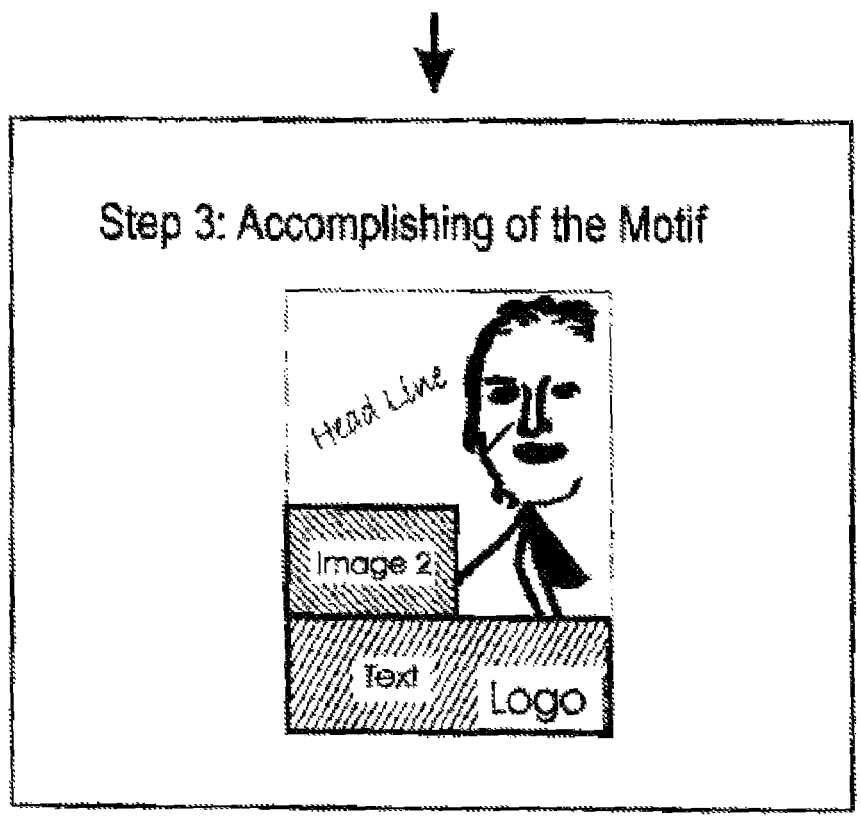

Automatic implementation is achieved by the invention in that in order to automatically arrange and change the size of the individual objects in the event of a change in the horizontal and/or vertical image dimension, object properties are assigned to each individual object via a data processing program that runs on a data processing system, these object properties are stored in a memory and a change in the size and/or position of the individual objects is carried out via the data processing program, wherein the object properties define a changeability of the individual objects.

11 Claims, 5 Drawing Sheets

U.S. PATENT DOCUMENTS

| | | | | |
|---|---|---|---|---|
| 5,754,873 | A | * | 5/1998 | Nolan .................... 715/235 |
| 5,761,662 | A | * | 6/1998 | Dasan .................... 707/10 |
| 5,796,401 | A | | 8/1998 | Winer |
| 5,960,126 | A | * | 9/1999 | Nielsen et al. ............. 382/298 |
| 6,401,075 | B1 | * | 6/2002 | Mason et al. .............. 705/14 |
| 6,456,305 | B1 | * | 9/2002 | Qureshi et al. ............ 715/800 |
| 6,826,314 | B2 | * | 11/2004 | Eguchi .................... 382/298 |
| 2003/0011636 | A1 | * | 1/2003 | Feroglia et al. ............ 345/767 |
| 2003/0179407 | A1 | * | 9/2003 | Herr ...................... 358/1.18 |

FOREIGN PATENT DOCUMENTS

| | | |
|---|---|---|
| DE | 10125110 | 12/2002 |
| EP | 0821313 | 1/1998 |
| GB | 2302524 A * | 1/1997 |
| JP | 06187336 A * | 7/1994 |
| JP | 08287117 | 1/1996 |
| WO | WO 9836630 | 8/1998 |
| WO | WO 02/27484 | 4/2002 |

OTHER PUBLICATIONS

SVG 1: Grundlagen skalierbarrer Webgrafik. Feb. 7, 2004. 6 pages. <http://www.heise.de/ix/artikel/2002/12/052/>.

Java 2 Platform, Standard Edition (J2SE). Jan. 7, 2004. 2 pages. <http://web.archive.org/web/20030603160053/http://java.sun.com/j2se/1.4.2/relnotes.html>.

Class JSplitPane. Jan. 7, 2004. 14 pages. <http://java.sun.com/j2se/1.4.2/docs/api/javax/swing/JSplitPane.html>.

* cited by examiner

Step 1b: Applying of the Raster

When the raster is applied, every frame receives via a parameter an instruction regarding his behavior in case of a increase of the height by δ mm or by γ%.

A raster built by this way shows directly the „reaction" of each separate part as a „whole" due to an enlargement.

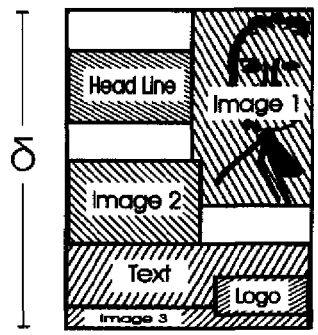

Herein and within the whole presentation the example bases on a vertical scaled display.

Step 2a: Inserting of Images

In case of images the essential control is achieved by different image sections whereby the aim is a large variability of the height/wigth ratio.

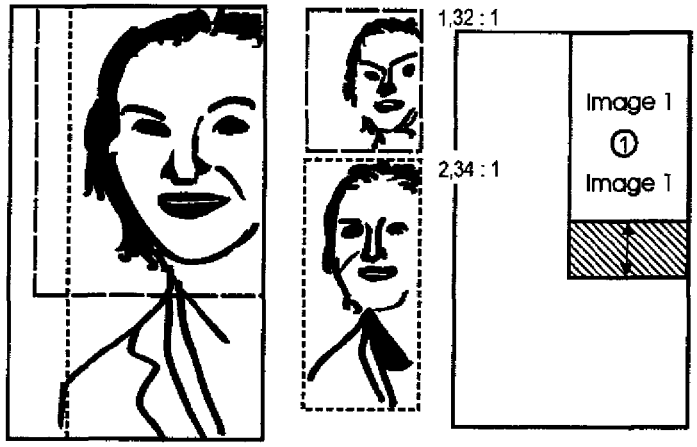

Fig.1b

METHOD FOR CHANGING THE DIMENSIONS OF AN ELECTRONICALLY STORED IMAGE

The invention relates to a method for changing the dimensions of an electronically stored image which is composed of individual objects that are arranged below or next to one another or that fully or partially overlap one another, in which the image is changed in at least one horizontal or vertical image dimension and at least some of the individual objects are changed in at least one horizontal or vertical object dimension and the change in the object dimension is sometimes not necessarily proportional to the change in the image dimension.

Methods for changing the dimensions of an electronically stored image of this type are known in general from the field of advertising. They are used to adapt the image to the various formats for example of a newspaper following the creation of a layout as a model for creating a print copy.

For instance, for example the column widths and lengths of various daily newspapers differ from one another, so that the same image cannot be used without modification. Furthermore, usually a whole series of advertisements is planned. In a magazine, for example, half a page may be booked as an advertisement feature. By contrast, in a national daily newspaper, a smaller and thus less expensive advertisement may be booked, for example in the format "third of a page, edgeways". In a local newspaper, on the other hand, the whole page is booked, and in another newspaper an advertisement in the format "two-thirds of a page, edgeways".

In the known methods, following creation of the image for the basic layout using commercially available DTP programs, the image is adapted to the various sizes. For this, the individual elements of the image are scaled and converted manually, and this not only leads to a great outlay on staff but also entails a less reproducible result. Furthermore, each advertisement must be released individually or else every conceivable format must be prepared prior to presentation of the project.

Figure 2:
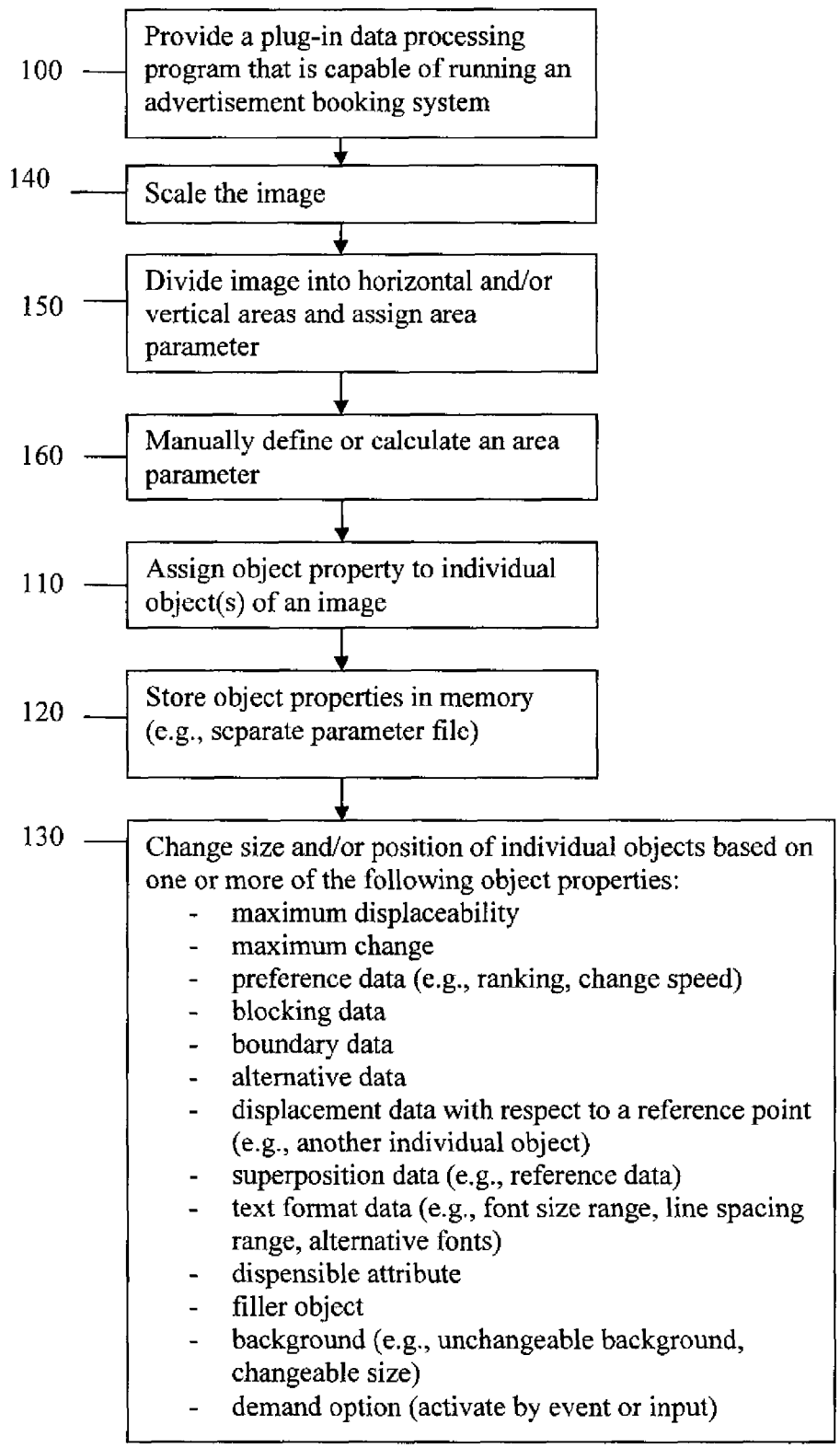

It is therefore an object of the invention to provide a method in which automated adaptation of the size of an image to various predefined formats is possible by means of a data processing system 100, as shown in FIG. 2.

This object is achieved according to the invention in that in order to automatically arrange and change the size of the individual objects in the event of a change in the horizontal and/or vertical image dimension, object properties are assigned 100 to each individual object via a data processing program that runs on a data processing system, these object properties are stored 120 in a memory and a change 130 in the size and/or position of the individual objects is carried out via the data processing program, wherein the object properties define a changeability of the individual objects.

By virtue of the configuration of the method according to the invention, each object of the image is now assigned at least one object property. Usually, a number of object properties will be defined which then determine how the object behaves in the event of a necessary change in size.

In one preferred embodiment of the method, firstly a rough adaptation of the image to the available space is carried out. For this purpose, as already known in the case of windows of operating systems by pulling at one of the corners of the window, a proportional increase or reduction 140 in size of the image is carried out so that it is adapted in one dimension—height or width.

Now the image will either be too large or too small in the second dimension, depending on the starting format. This adaptation is then carried out automatically via a data processing program. The data processing program runs on a data processing system, wherein the term data processing system is to be understood as meaning not only individual computers but also networks in which the individual components are installed on various computers.

In order to adapt the size of the image, the image is regarded as being composed of a number of individual objects. These individual objects are assigned the object properties which prevent the image from being distorted in the event of an increase or reduction in size of the image. The method will be described below in the case of an increase in size of an image during the second method step following proportional adaptation to the first dimension, with the method being carried out in an analogous manner in the case of a reduction in size.

The simplest way would be to increase the size of all objects by the factor needed to fill the gaps. However, in most cases this would lead to uncontrolled superposition of the individual objects with one another or to growth beyond the edges. For this reason, the dimensions of the individual objects are preferably changed only in the direction in which the increase in size is required. The object properties define, depending on the presets and type of individual object, how this growth on one side is to take place without the individual object becoming distorted.

Firstly, the object properties may bring about for example for each individual object a proportional increase in size and displacement of the then grown individual objects inwards, in order to prevent an individual object from growing out over the edge. However, pure displacement of the objects will usually not suffice; rather, the individual objects are then pushed on top of one another in the region of the centre of the image. For this reason, at least some of the individual objects have to be exclusively or at least predominantly increased in size in one direction.

If the individual object is an image, this may be achieved simply by defining an edge region which can be cut off if necessary. Thus, preferably when the image is created, a photograph is selected as individual object whose edge region is large enough to have a defined tolerance range which can be cut off if the image has to be reduced in size or can be added to if the image has to be increased in size. The latter case is of course only possible if the image is created using individual objects of which only an inner area is used for the actual image. If, on the other hand, the object properties are allocated subsequently, of course no further area can be added. In this case, the individual object would advantageously have to be firstly enlarged proportionally in both dimensions and then trimmed on one side.

The text components of the image are also composed as an individual object. In this case, however, cutting of this individual object is not possible, so that either this individual object behaves like a text box of a commercially available text processing program, that is to say the text can be converted within the frame, in particular can be reformatted to the new space conditions. This reformatting may consist in a simple adaptation of the line spacing, the character spacing or the font size.

Preferably, however, an alternative text may also be stored, so that a shorter text variant can be selected if a minimum size is not reached. This prevents the text from becoming illegible as a result of the reduction in size. A replacement object may also be provided for other individual objects, so that a smaller image or a larger image is available for instance in the case of graphics. Alternatively, a text may also be reduced in size in that some passages of the text are marked as dispensable and the individual object is composed of various parts, wherein the object properties contain the information that individual parts of the individual object may be omitted if it has to be greatly reduced in size.

The object properties may comprise a blocking data for some individual objects, which indicates that an object cannot be changed in terms of its size. This option may be selected for example in the case of a company logo which should always retain the same size over the entire range of the change in size of the overall image.

The individual objects may be drawn inwards not only by simple displacement. It is furthermore also possible to displace the individual objects relative to any reference point, which may also be part of another individual object. For example, an image may have three photographs arranged next to one another as individual objects, wherein when this image is reduced in size, the photographs are not pushed together but rather the two outer individual objects migrate downwards on a circular path, so that a triangular arrangement exists after the change in size.

Preferably, the object properties of at least one partially superposable individual object comprise a superposition data which defines an area of the individual object that may be superposed by other objects when the objects are pushed together. In order not to allow all the individual objects to superpose at will, the object properties of the partially superposable individual object may comprise one or more reference data which indicates which other individual object is able to superpose the partially superposable individual object.

Usually, an image will contain part-areas which can be easily reduced in size and part-areas which should be reduced in size only if really necessary. The data processing program can take this into account in a preference data, wherein the preference data of all the individual objects define a ranking which indicates in which order the individual objects are changed on the basis of the remaining object properties. Thus, individual objects with a low preference are change to a greater extent in terms of their size than individual object with a high preference. The preference data may also lead to a hierarchical change so that firstly the individual objects with a low preference are modified and only later are those with a high preference modified. A combination of hierarchical order and a growth in size at the same time but to varying extents is also possible.

Some of the individual objects may be purely filler objects of a large image, wherein the object properties comprise the data that the filler object may be omitted if a critical reduction in the size of the image is reached. This may occur in particular in the case of vary large fluctuations in size with many text components, since otherwise the legibility of the text could be at risk.

As background of the image, there may be a background image which is superposed by other individual objects. Like the other objects, the background object is an individual object which is provided with background properties which define the change in the background object in the event of a change in its size. This may occur for example in that the background consists of unchangeable background elements which are arranged next to and/or below one another, wherein the background elements arranged at the edge are trimmed to the current size of the image.

In a further preferred embodiment of the method, the image is divided 150 (see FIG. 2) into horizontal and/or vertical areas, wherein each area is assigned 150 (see FIG. 2) an area parameter which defines an extent of the ability of the area to change its size, wherein in the event of a change in the size of the image firstly the sizes of the areas are defined on the basis of the extents of the ability to change size and then within the areas the individual objects arranged therein are adapted in terms of their size to the size of the area. This leads firstly to a rough planning of the image and makes it possible for account to be taken of image areas which are relatively inflexible or not flexible at all.

For example, it may be that the upper half of an image can be increased in size without any problems while the lower half almost exclusively contains individual objects which can hardly or not at all be changed. If, then, each area of the image were to be increased in size proportionally in the same way, this would lead to problems in the lower area. It may also be that both the lower and a relatively narrow upper region can be greatly increased in size while there is an area in the middle whose size should not be changed. The division of the image into areas can be used here for example to displace the rigid area as a whole.

The area parameter can be manually predefined 160 (see FIG. 2) when the image is created or else subsequently. A further variant consists in allowing the area parameter to be calculated 160 (see FIG. 2) via the data processing program on the basis of the object properties assigned to each individual object. In this case, the data processing program will firstly determine for each area a minimum area size by changing the size of the individual objects according to the principles described above, then will determine a maximum area size and then, based on a mean value from the minimum and maximum area size, will reduce the size of the areas in steps until the areas cover the desired surface area of the image, wherein once the area sizes have been defined the objects arranged in the areas are adapted in terms of their size.

The object properties may comprise a demand option which means that during processing by the software a window is opened via which a user of the data processing system can change the preset object properties once again in order to subsequently affect the change in size in order to define the object properties. The demand option may be activated in the event of a change in size of the individual object or by the user by means of an input, in particular by clicking on the individual object using a computer mouse.

The method according to the invention is preferably used to space advertisements starting from a basic image of a campaign. For this purpose, the data processing program preferably has predefined image sizes which correspond to standard sizes in print media. The object properties are preferably defined immediately when the image is created. However, they may also be added later, for example once the image has been imported into the data processing program. The object properties may be stored in the image as additional information, but will preferably be stored in a separate parameter file.

Furthermore, the individual objects may be stored in such a parameter file while the image contains only a framework which is filled with the individual objects following size modification. The data processing program may be designed as a plug-in program for implementation in a commercially available graphics program, in particular a DTP program. For instance, an additional module may train conventional DTP software to automatically carry out size adaptation.

A method according to the invention is used for example in an advertisement booking system in which the image is created using a graphics program which runs on a data processing system integrated in a network. Usually, the image firstly contains only a framework, while the individual objects are stored in a catalogue file. A parameter file, which may be identical to the catalogue file, contains the information as to which individual object is arranged where. The image file thus created can be transmitted via the network to a printing preparation station, wherein once the image file has been created in the graphics program, the size of the image on which the image file is based can be adapted to commercial column or page dimensions of print media in accordance with the method described above.

Further features and advantages of the invention will emerge from the dependent claims and from the following description of an example of embodiment with reference to the drawing.

FIG. 1 shows, in the form of a flow chart, an example campaign in which an advertisement page is scaled using the method according to the invention.

In a step 1a, firstly a general scaling direction is defined in which the image can be stretched. The direction orthogonal thereto is taken into account beforehand via a pure increase or reduction in size of the image. If, for example, as in the example shown, the width of the image is adapted via the increase in size of the image, it must be expanded in terms of its length in order to be able to use up the available space or to be adapted to the available height.

In step 1b, each individual object is assigned a parameter which indicates how the individual object will behave in the event of an increase in height by .delta. mm. In step 2a, the image elements in the object are then inserted. For this purpose, use is made of the parameter which the creator of the image has defined beforehand.

Here, images may be changed in terms of their size or even trimmed in order not to allow individual parts of the image to become so small that they look unpleasant or can no longer be seen. Conversely, it is also possible for an image to be greatly increased in size by for example an additional image section being added.

In step 2b, text elements are then inserted. For this purpose, different variations are available; in particular, the size of the text can be adapted via the line spacing. Furthermore, the font size can be used to prevent line or character spacings from becoming too great.

Once the individual objects have been adapted to the available space, and if necessary have been displaced, the overall image can be completed as an advertisement model.

The invention claimed is:

1. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein at least some individual objects are drawing objects, wherein the object properties additionally comprise a boundary data which defines a tolerance range, wherein the change in size of the drawing object also takes place by cutting off or adding an edge area to at least one side of the drawing object.

2. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein the object properties of at least one partially superposable individual object comprise a superposition data which defines an area of the individual object that may be superposed by other objects.

3. The method of claim 2, wherein the object properties of the partially superposable individual object comprise one or more reference data which indicates which other individual object is able to superpose the partially superposable individual object.

4. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein at least some individual objects are text objects, the object properties comprise the text format data of the maximum variation range of the font size and/or of the maximum variation range of the character spacing and/or of the maximum variation range of the line spacing, wherein the text objects individual passages are provided with a dispensable attribute, wherein passages provided with the dispensable attribute are deleted if the maximum reduction in size is reached.

5. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein at least some individual objects are filler objects, wherein the object properties comprise the data that the filler object may be omitted if a critical reduction in the size of the image is reached.

6. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein at least one background object is superposed by other individual objects and is provided with background properties which define the change in the background object in the event of a change in its size.

7. The method of claim 6, wherein the background properties define the fact that the background consists of unchangeable background elements which are arranged next to and/or below one another, wherein the background elements arranged at the edge are trimmed to the current size of the image.

8. The method of claim 6, wherein the background properties define the fact that the background consists of background elements having a changeable size which are arranged next to and/or below one another, wherein the background elements arranged at the edge are trimmed to the current size of the image.

9. A method for changing the dimensions of an electronically stored image, the electronically stored image being composed of individual objects that are arranged below or next to one another or that fully or partially overlap one another, in which the electronically stored image is changed in at least one horizontal or vertical image dimension and at least some of the individual objects are changed in at least one horizontal or vertical object dimension, the method comprising:

assigning object properties to each individual object using a data processing program that operates on a data processing system, the object properties being assigned for arranging and changing the size of the individual objects in the event of a change in the horizontal and/or vertical image dimension; and storing the object properties in a memory module, the object properties define a changeability of the individual objects, the object properties having a preference data, the preference data of all the individual objects are changed on the basis of the remaining object properties, the preference data defining a change speed, wherein the individual objects can be changed at the same time, individual objects with a lower preference data undergo a greater change in size than individual objects with a greater preference data wherein the image is divided into horizontal and/or vertical areas, each area is assigned an area parameter which defines an ability of the area to change its size, in the event of a change in the size of the image the sizes of the areas are defined on the basis of the ability to change size and then within the areas the individual objects arranged therein are adapted in terms of their size to the size of the area.

10. The method of claim 9, wherein the area parameter is manually predefined.

11. The method of claim 9, wherein the area parameter is calculated via the data processing program on the basis of the object properties assigned to each individual object, wherein the data processing program determines for each area a minimum area size by changing the size of the individual objects, then determines a maximum area size and then, based on a mean value from the minimum and maximum area size, reduces the size of the areas in steps until the areas cover the desired surface area of the image, wherein once the area sizes have been defined the objects arranged in the areas are adapted in terms of their size.

* * * * *